United States Patent
Choi et al.

(10) Patent No.: US 9,014,286 B2
(45) Date of Patent: Apr. 21, 2015

(54) METHOD AND APPARATUS OF GENERATING PILOT SEQUENCE

(71) Applicant: LG Electronics Inc., Seoul (KR)

(72) Inventors: Jin Soo Choi, Anyang-si (KR); Seung Hee Han, Anyang-si (KR); Jin Sam Kwak, Anyang-si (KR); Yong Ho Seuk, Anyang-si (KR); Jeong Ki Kim, Anyang-si (KR)

(73) Assignee: LG Electronics, Seoul (KR)

( * ) Notice: Subject to any disclaimer, the term of this patent is extended or adjusted under 35 U.S.C. 154(b) by 0 days.

(21) Appl. No.: 14/353,461

(22) PCT Filed: Oct. 12, 2012

(86) PCT No.: PCT/KR2012/008349
§ 371 (c)(1),
(2) Date: Apr. 22, 2014

(87) PCT Pub. No.: WO2013/122301
PCT Pub. Date: Aug. 22, 2013

(65) Prior Publication Data
US 2014/0286455 A1    Sep. 25, 2014

Related U.S. Application Data

(60) Provisional application No. 61/598,911, filed on Feb. 15, 2012, provisional application No. 61/599,940, filed on Feb. 17, 2012.

(51) Int. Cl.
*H04L 27/26* (2006.01)
*H04L 5/00* (2006.01)

(52) U.S. Cl.
CPC .......... *H04L 27/2613* (2013.01); *H04L 5/0007* (2013.01); *H04L 5/0048* (2013.01)

(58) Field of Classification Search
CPC ................. H04B 1/76; H04L 27/01; H04L 27/10–27/16; H04L 27/103
USPC ......... 375/141, 145, 146, 260, 298, 354, 362, 375/364, 366, 367, 377; 370/500, 509, 510, 370/512, 514, 515
See application file for complete search history.

(56) References Cited

U.S. PATENT DOCUMENTS

| | | |
|---|---|---|
| 2011/0159882 A1* | 6/2011 | Ho et al. ............... 455/450 |
| 2012/0113974 A1* | 5/2012 | Zhu et al. .............. 370/344 |
| 2012/0207237 A1* | 8/2012 | Kwak et al. ........... 375/267 |

FOREIGN PATENT DOCUMENTS

KR    10-2008-0000777 A    1/2008

OTHER PUBLICATIONS

Hongyuan Zhang et al. "Single Stream Pilots for 11ah", IEEE 802.11 WLAN WG, IEEE 802. 11-12/0098r1 Jan. 16, 2012, see the whole document.
Allert van Zelst et al., "Pilot Sequence for VHT-DATA", IEEE 802.11 WLAN WG, IEEE 802. 11-10/0811r1, Jul. 12, 2010, see the whole document.

* cited by examiner

*Primary Examiner* — Dac Ha
(74) *Attorney, Agent, or Firm* — McKenna Long & Aldridge LLP

(57) ABSTRACT

A method of transmitting pilots id disclosed. The method of transmitting pilots includes transmitting pilots over N orthogonal frequency division multiplexing (OFDM) symbols, wherein a pilot at subcarrier k for OFDM symbol n is determined to have time varying characteristic, thereby to prevent the cause of spectral lines.

12 Claims, 15 Drawing Sheets

Fig. 5

| STF1 (same periodicity as 2MHz, 3dB power boost for rep-2) (500) | LTF1 (Orthogonal in freq domain to 2MHz LTF) (510) | Repetition coded SIG Field (520) | LTF2 to LTFN (for MIMO) | Repetition or non-repetition encoded Data (550) |
|---|---|---|---|---|
| 4 symbols | 4 symbols=160μs | 4 or 6 symbols | | |

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

1MHz (1100)

2MHz (1120)

4MHz (1140)

8MHz (1180)

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | -1 | -1 | 1 | 1 | 1 |

1MHz 1ss pilot sequence (1200)

2MHz 1ss pilot sequence

4MHz 1ss pilot sequence

8MHz 1ss pilot sequence

METHOD AND APPARATUS OF GENERATING PILOT SEQUENCE

This application is a National Stage Application of International Application No. PCT/KR2012/008349 filed Oct. 12, 2012, and claims priority to and the benefit of U.S. Provisional Application No. 61/598,911, filed on Feb. 15, 2012, and U.S. Provisional Application No. 61/599,940, filed on Feb. 17, 2012, the disclosures of which are incorporated by reference herein in their entirety.

TECHNICAL FIELD

The present invention relates to a wireless communication, and more particularly to a method and apparatus of generating pilot sequences.

BACKGROUND ART

A Machine-to-Machine (M2M) system is recently attracting attention as a next-generation communication technology. A new IEEE 802.11 ah standard is establishing to support the M2M system even in a IEEE 802.11 WLAN (wireless local area network). A machine rather than a man becomes the subject of the communication and transmits/receives information in a network used in the M2M system. One element of the M2M system may become from the sensors such as a temperature sensor or a humidity sensor to home appliances such as a camera, a TV etc., processing machines in a factory, and large machines such as an automobile.

In recent, as various communication services such as smart grid, E-Health and ubiquitous are emerging, the M2M technology for supporting them has been highlighted. The characteristics of the M2M system are as follows.

1) Many stations: it is assumed that, unlike the existing network, many stations are present in the network used in the M2M system. This is because the sensor etc. disposed at home, company etc. as well as the machine such as a terminal owned by individuals should be considered in the M2M system. Therefore, fairly many stations may be connected to one AP (access point).

2) Low traffic load per station: in general, the M2M terminal has traffic patterns of collecting and reporting peripheral information such that there is no need to frequently transmit data and the amount of data to be transmitted is also small.

3) Uplink is main: a M2M network mainly receives commands by downlink and has the structure of reporting resulting data by uplink after taking actions. Since main data are usually transmitted by uplink, the uplink is main in the M2M network.

4) Long-life station: the M2M terminal is mainly operated by a battery, and there are many cases difficult for an user to frequently charge the battery. Therefore, The M2M terminal are required to minimize battery consumption to ensure long life.

5) Automatic recovering function: the M2M terminal is difficult to directly operate by the man in a specific situation, and therefore, the function of recovering the terminal for oneself is required.

The distinctive feature of IEEE 802.11 ah is that a non-permission band of sub 1 GHz except a TV white space band may be used as the frequency band. On using sub 1 GHz band, the coverage in the network may have a fairly wide coverage (up to 1 km) as compared with the WLAN focused on the existing indoor facility. That is, unlike the existing WLAN frequency band, that is, 2.4 GHz or 5 GHz, when the WLAN is used in the frequency band of sub 1 GHz representative of 700-900 MHz, the coverage of the AP is extended by two to three times as compared with the same transmitting power due to radio wave characteristic of the corresponding band. Due to this characteristic, it is assumed that fairly many STAs per one AP may be connected in 802.11 ah standard.

The use cases considered in IEEE 802.11 ah standard may include cases below.
  Use Case 1: Sensors and meters
  1a: Smart Grid—Meter to Pole
  1c: Environmental/Agricultural Monitoring
  1d: Industrial process sensors
  1e: Healthcare
  1f: Healthcare
  1g: Home/Building Automation
  1h: Home sensors
  Use Case 2: Backhaul Sensor and meter data
  Backhaul aggregation of sensors
  Backhaul aggregation of industrial sensors
  Use Case 3: Extended range Wi-Fi
  Outdoor extended range hotspot
  Outdoor Wi-Fi for cellular traffic offloading The case of Use Case 1, that is, Sensors and meters is the use case related to M2M communication described above, and in this case, various kinds of sensor devices are connected to the AP using 802.11 ah standard to perform the M2M communication. Particularly, in case of a smart grid, the sensor devices up to 6000 may be connected to one AP.

In case of Use Case 2, that is, Backhaul Sensors and meter data, 802.11 ah AP providing a wide coverage functions to link to a backhaul of a different system such as 802.15.4g.

The Use Case 3 includes the case performing an outdoor extended range hotspot communication such as an Extended home coverage, a campus wide coverage, shopping malls, and the case distributing heavy-loaded cellular traffics by supporting traffic offloading of cellular mobile communication by 802.11ah AP.

The frame structure should be used in 2/4/8/16/8+8 MHz channel bandwidth at the frequency band at 802.11ah standard, that is, sub 1 GHz band. The frame structure that may be used at this frequency band may use the structure for simply 1/10 down-clocking PPDU frames used at the existing IEEE 802.11 ac standard. That is, the frame format used in 20/40/80/160/80+80 MHz channel bandwidth at 802.11ac standard is 1/10 down-clocked to generate the frame format used in 2/4/8/16/8+8 MHz channel bandwidth at sub 1 GHz band.

DISCLOSURE OF INVENTION

Technical Problem

An advantage of some aspects of the invention is that it provides a method of generating a frame that may be used at sub 1 GHz band.

Another advantage of some aspects of the invention is that it provides a device of performing a method of generating the frame that may be used at sub 1 GHz band.

Solution to Problem

To achieve the above objects, according to an aspect of the present invention, a method of transmitting pilots may includes transmitting pilots over N orthogonal frequency division multiplexing (OFDM) symbols, wherein a pilot $P_n^k$ at subcarrier k for OFDM symbol n is determined by:

$$P_n^{k=-7} = \Psi_{(n \bmod 2)+2}, P_n^{k=7} = \Psi_{((n+1) \bmod 2)+2}, P_n^{k \notin \{-7,7\}} = 0$$

where a OFDM symbol index n=0, . . . , N−1, pilot values $\Psi_2=1$ and $\Psi_3=-1$. A bandwidth of the transmitted pilots may be 1 MHz. k may be an integer in the range $-K \leq k \leq K(k \neq 0)$, and K may be an integer in the range $7 \leq K \leq 28$. The method of transmitting pilots may further includes selecting a transmission bandwidth, determining predetermined pilot values in a pilot value mapping table according to a range of the transmission bandwidth and inserting the predetermined pilot values over N orthogonal frequency division mul-$\Psi_2$, $\Psi_3$} in the pilot value mapping table when the range of the transmission bandwidth is 1 MHz; and wherein the pilot value mapping table is specified as below

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1. |

The pilots may be BPSK (binary phase shift keying) modulated by pseudo-binary sequence. The transmitting the pilots over N OFDM symbols may include transmitting first pilots for a first spatial stream, copying a mapping of the first pilots to a mapping of a second pilots of a second spatial stream and transmitting the second pilots of the second spatial steam.

To achieve the above objects, according to an aspect of the present invention, a wireless device configured to transmit control signals in a wireless communication system, the wireless device may include a processor configured to transmit pilots over N orthogonal frequency division multiplexing (OFDM) symbols, wherein a pilot $P_n^k$ at subcarrier k for OFDM symbol n is determined by:

$$P_n^{k=-7}=\Psi_{(n \bmod 2)+2}, P_n^{k=7}=\Psi_{((n+1) \bmod 2)+2}, P_n^{k \notin \{-7,7\}}=0$$

where a OFDM symbol index n=0, . . . , N−1, pilot values $\Psi_2=1$ and $\Psi_3=-1$. A bandwidth of the transmitted pilots may be 1 MHz. k may be an integer in the range $-K \leq k \leq K(k \neq 0)$, and K is an integer in the range $7 \leq K \leq 28$. The processor may be further configured to transmit pilots over N orthogonal frequency division multiplexing (OFDM) symbols by selecting a transmission bandwidth, determining predetermined pilot values in a pilot value mapping table according to a range of the transmission bandwidth and inserting the predetermined pilot values over N orthogonal frequency division multiplexing (OFDM) symbols, wherein the predetermined pilot values $\{\Psi_2, \Psi_3\}$ are in the pilot value mapping table when the range of the transmission bandwidth is 1MHz and wherein the pilot value mapping table is specified as below

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1. |

The pilots may be binary phase shift keying(BPSK) modulated by pseudo-binary sequence. The step of transmitting the pilots over N OFDM symbols may be include transmitting first pilots for a first spatial stream, copying a mapping of the first pilots to a mapping of a second pilots of a second spatial stream and transmitting the second pilots of the second spatial stream.

Advantageous Effects of Invention

According to an embodiment of the present invention, a method and apparatus of generating pilot sequences may generate the pilot sequences having a nested structure capable of inferring the pilot sequences used at each frequency band, and therefore, may reduce memories necessary to generate the pilot sequences. Further, the values of each pilot tone have time varying characteristic, thereby to prevent the cause of spectral lines.

BRIEF DESCRIPTION OF DRAWINGS

FIG. 5 is a conceptual view showing the frame that may use in the frequency bandwidth of 1 MHz at sub 1 GHz (S1G) band according to the embodiment of the present invention.

MODE FOR THE INVENTION

Figure 1:
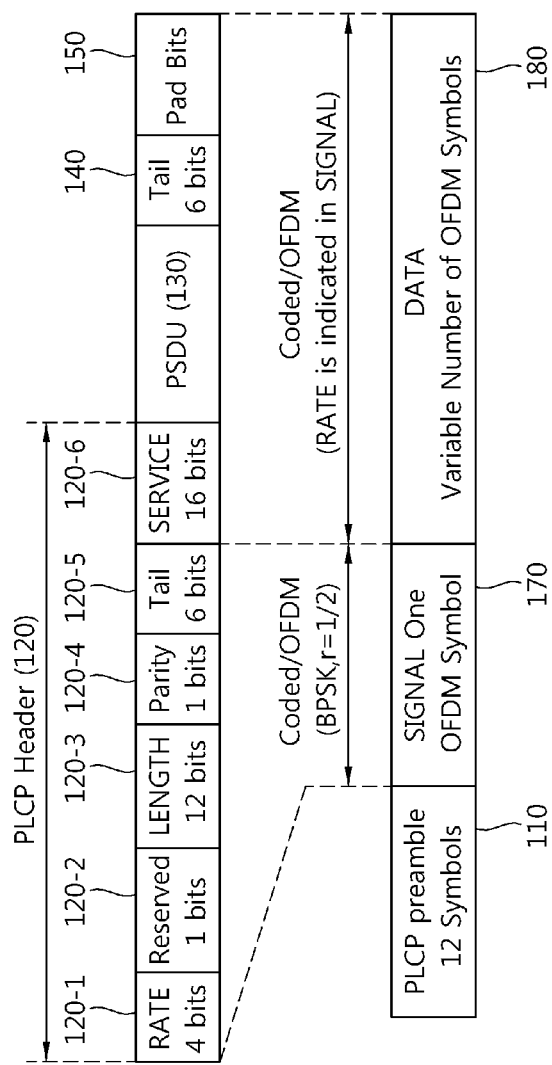
FIG. 1 is a conceptual view showing a PPDU frame format.

FIG. 1 is a conceptual view showing a PPDU frame format.

The PPDU frame format shown in FIG. 1 shows a PLCP frame format enclosed in chapter 18.3 of IEEE Draft P802.11-REVmb tm/D 12. Part 11: Wireless LAN Medium Access Control (MAC) and Physical Layer (PHY) Specifications (hereinafter, refers to 802.11 In standard) published on November, 2011. The definite functions and roles for each field included in the PPDU frame format 100 is the same as those of the 802.11n standard.

Referring FIG. 1, the PPDU frame format 100 may include a PLCP preamble 110, a PLCP header 120, a PSDU 130, tail bits 140 and pad bits 150. The PLCP header 120 may include a rate 120-1, a reserved 120-2, a length 120-3, a parity 120-4, a tail 120-5 and a service 120-6 as field information.

The PLCP preamble 110 may include a plurality of short training symbols and long training symbols. OFDM (orthogonal frequency division multiplexing) symbols included in the PLCP preamble 110 may be transmitted without coding and scrambling.

The field information included in the PLCP header 120, that is, the rate 120-1, the reserved 120-2, the length 120-3, the parity 120-4, the tail 120-5, and the service 120-6 are modulated and coded based on a MCS (modulation coding scheme) using a BPSK (binary phase shift keying) and a coding rate of 1/2 size and therefore may be mapped on one OFDM (orthogonal frequency division multiplexing) symbols 170. All of the rate 120-1, the reserved 120-2, the length 120-3, the parity 120-4 and the tail 120-5 but the service 120-6 of them may be mapped on one OFDM symbol, that is, signal 170.

The signal 170 may include various kinds of information to decode and demodulate data 180 at a receiving end. For example, the rate 120-1 may include MCS information of data 180, and the length 120-3 may include information for the number of bit included in transmission packets. Further, the parity 120-4 may include information about whether errors are caused in the PLCP header 120.

The service 120-6, a PSDU 130, a tail 140, pad bits 150 may be mapped on a plurality of OFDM symbols, that is, the data 180. The first 7 bits of 16 bits included in the service field 120-5 may be used so that scrambling sequences used in a transmitter and scrambling sequences used in a receiver becomes the same from each other. The remaining 9 bits are set to 0 as reserved bits.

Figure 2:
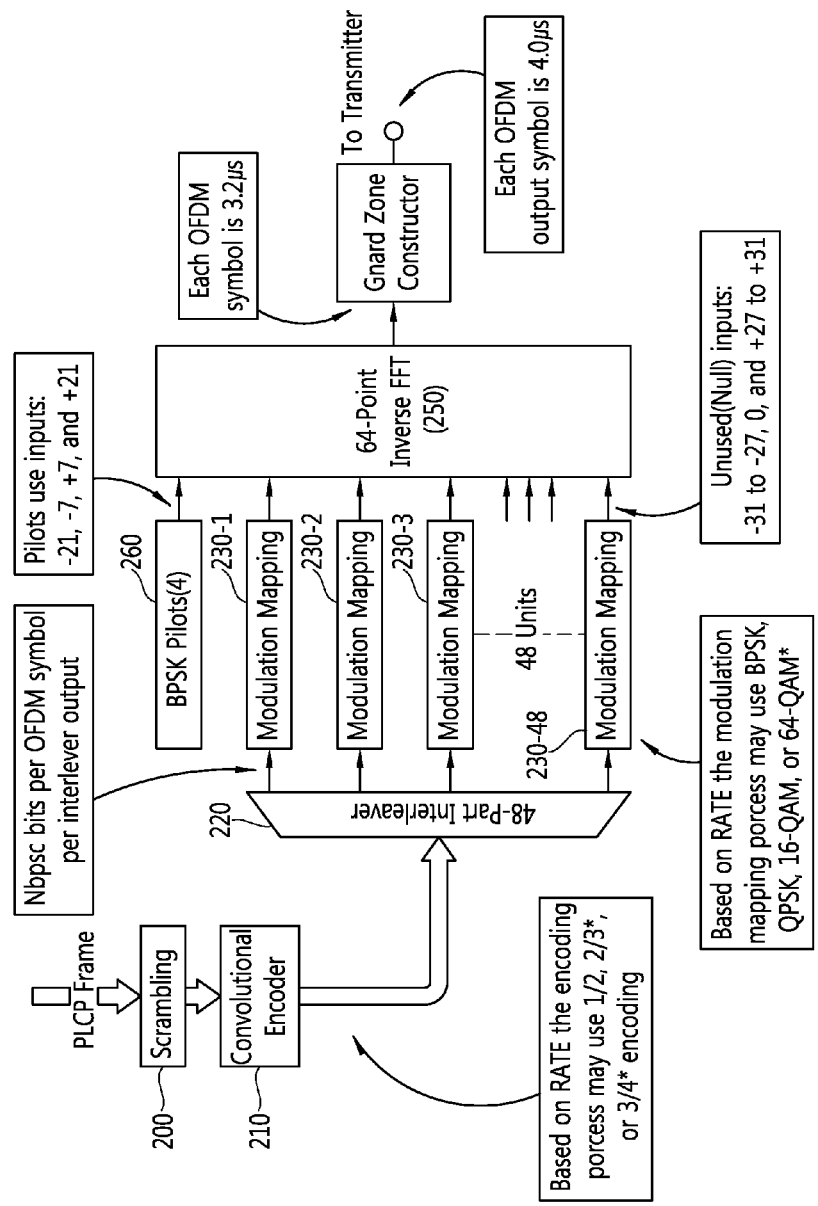
FIG. 2 is a conceptual view showing an OFDM modulation method.

FIG. 2 is a conceptual view showing an OFDM modulation method.

FIG. 2 shows the method that the service 120-6, the PSDU 130, the tail 140 and the pad bits 150 described in FIG. 1 above are mapped on a plurality of OFDM symbol data 180. The portion including the service 120-6, the PSDU 130, the tail 140 and the pad bits 150 in the PPDU frame may be defined as a terminology called a PLCP data field.

Referring FIG. 2, the PLCP data field may pass through a scrambler 200 and a convolution encoder 210. The coding rate used in the convolution encoder 210 may have values determined from the rate of signal included in the above-described PLCP header, for example, rates of 1/2, 2/3 and 3/4 size.

The PLCP data field scrambled and encoded by the scrambler 200 and the convolution encoder 210 may be transmitted to an interleaver 220. The interleaver 220 performs the same role as a demultiplexer such that the data to be inputted may be dis-tributed into a plurality of output ports of the interleaver 220.

On later performing an IFFT (inverse fast fourier transform) using the interleaver 220, it is possible to not map the bits adjacent to the PLCP data field on subcarriers adjacent to them. The interleaver 220 may simultaneously transmit the bits corresponding to NCBPS (number of coded bits per symbol) based on NCBPS values, and modulation mapping units 230-1 to 230-48 enable the bits to be received to be transformed into scaled I and Q values.

48 values modulated by the modulation mapping units 230-1 to 230-48 may performs a 64-point inverse FFT by an IFFT unit 250. 4 pilot tones 260 modulated by the BPSK are also inputted to the IFFT unit 250 to perform 64 point inverse FFT. On using 4 pilot tones 260, the pilot tones may be included in −21, −7, 7, 21 of the indexes of the subcarriers on a frequency axis. That is, 52 input values are inputted to the IFFT unit 250, and all of 12 values but 52 input values of 64 input values may be set to 0.

The IFFT unit 250 performs the IFFT to generate valid OFDM symbols having the period of 3.2 us. The valid OFDM symbols having the period of 3.2 us further include a CP (cyclic prefix) of 0.8 us generated by a guard zone constructor (280) to generate OFDM symbols having the symbol duration of 4 us.

Figure 3:
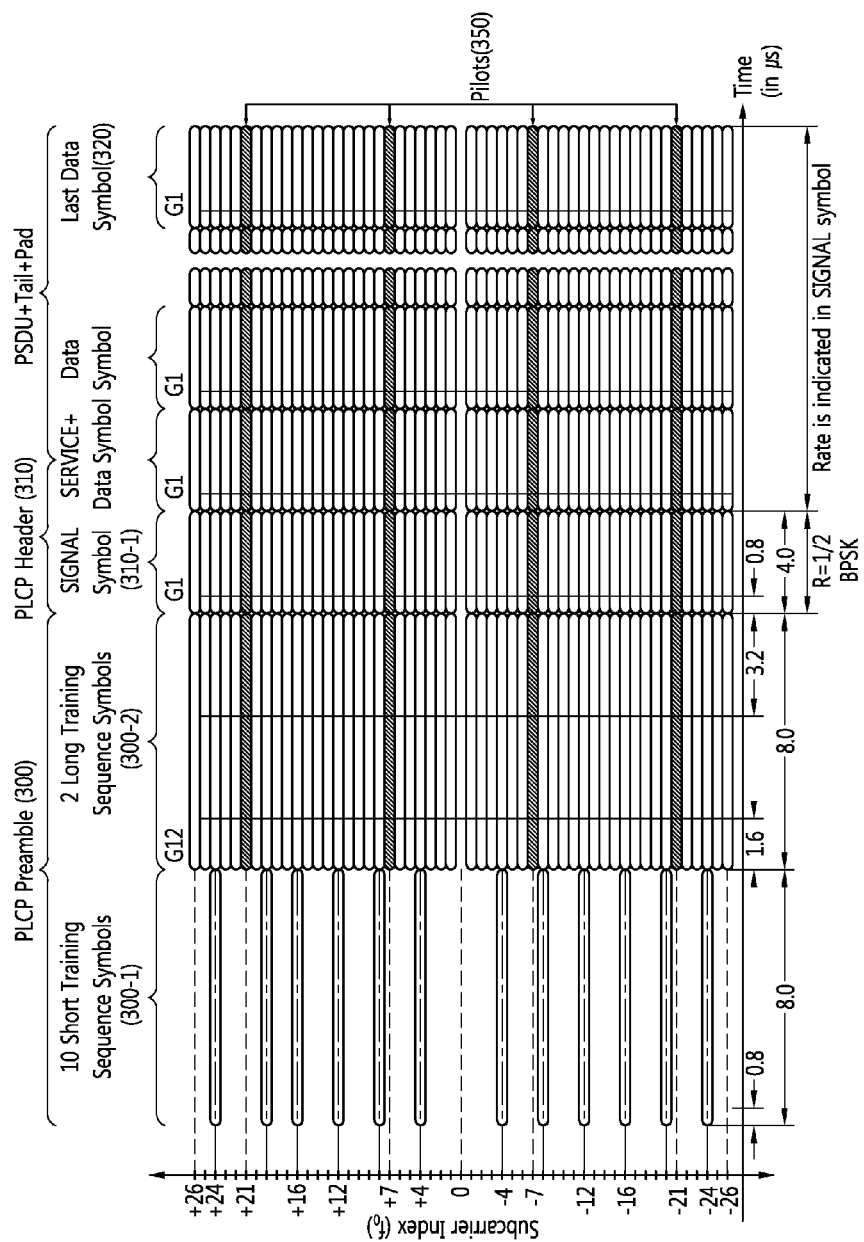
FIG. 3 is a conceptual view representing the PPDU frame on time axis and frequency axis.

FIG. 3 is a conceptual view representing the PPDU frame on time axis and frequency axis.

As described above, the PPDU frame may include a PLCP preamble 300, a PLCP header 310, a PSDU+tail bits+pad bit 320.

Subcarriers on the frequency axis may be mapped on index values corresponding to −26~+26.

The PLCP preamble 300 may include 10 short training sequence symbols 300-1 and 2 long training sequence symbols 300-2.

The 10 short training sequence symbols 300-1 may be included for each fourth subcarrier besides 0th subcarrier on the frequency axis. A GI (guard interval) may not be used in the 10 short training sequence symbols 300-1.

The 2 long training sequence symbols 300-2 may be transmitted from all of 52 subcarriers besides 0th subcarrier. The 2 long training sequence symbols 300-2 may position the GI of 1.6 us which is the size twice the size of the GI having 0.8 us at front end thereof.

After the PLCP preamble 300 is transmitted, signal symbols 310-1 of the PLCP header 310 may be transmitted. The signal symbols 310-1 may be transmitted from all of 48 subcarriers besides 4 subcarriers to which pilot tones are transmitted. The signal symbols 310-1 may use the BPSK and coding rate=1/2 by the MCS method. The front end of the signal symbols 310-1 may be positioned with the GI having 0.8 us.

The pilot tones 350 may be transmitted so that the signal symbols 310-1 are included in the same positions on the subcarriers from transmission beginning to a last transmission symbol. For example, 4 pilot tones 350 may be transmitted from [−21, −7, 7, 21] on the indexes of the subcarriers to the last transmission symbol.

The remaining data symbols 320 may include a service field+data symbol, a data symbol and a last data symbol. The OFDM symbols corresponding to the data symbol 320 may include the GI at the front end of the symbols and are transmitted while being included in the remaining positions besides the positions of the subcarriers included with the pilot tones.

FIG. 3 described the case that the period of one OFDM symbol is 4 us. When a transmission frequency bandwidth of transmitting OFDM symbols is reduced to 1/10, it is possible to support a frequency bandwidth reduced to 1/10 using the PPDU frame performed with 1/10 down clocking.

Figure 4:
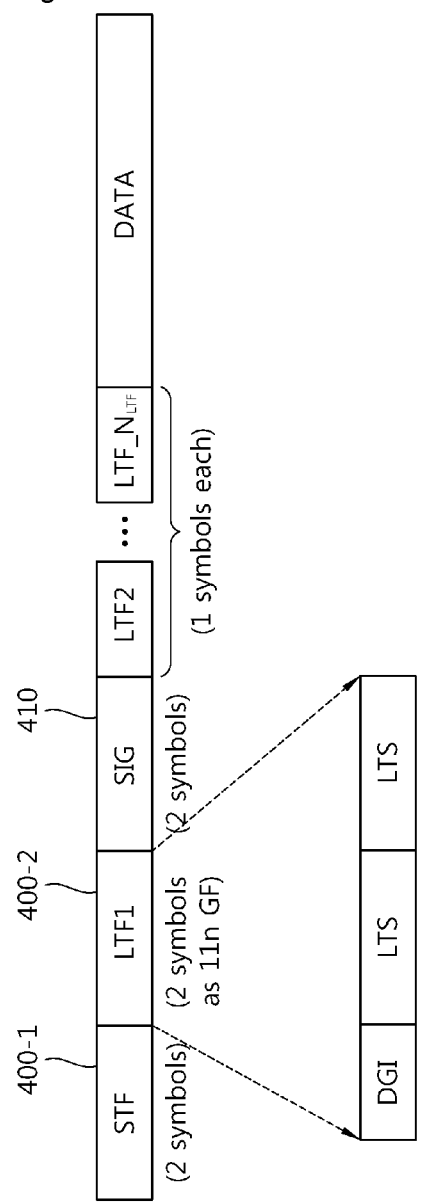
FIG. 4 is a conceptual view showing the PPDU frame performed with the 1/10 down clocking.

FIG. 4 is a conceptual view showing the PPDU frame performed with the 1/10 down clocking.

Referring to FIG. 4, a frame format down-clocks the existing frame format and may use the down-clocked frame format. As described above, for example, the frame format that may use at a SIG band may use a frame format 1/10 down-clocking a HT (high throughput)-greenfield format PPDU enclosed in chapter 20.3 of IEEE Draft P802.11-REVmb/D12. Part 11: Wireless LAN Medium Access Control (MAC) and Physical Layer (PHY) Specifications (hereinafter, refers to 802.11n standard) published on November, 2011.

As shown in FIG. 4, the periods of the OFDM symbols of the frame format (hereinafter, refers to 1/10 down clocked S1G frame format) 1/10 down clocking the HT-greenfield format PPDU may be increased by 10 times the periods of the OFDM symbols of the frame before the 1/10 down clocking is performed. For example, the duration of one OFDM symbol in a 1/10 down clocked SIG frame format may become 40 us of 10 times the duration of the existing OFDM symbols, that is, 4 us. Further, the GI is increased by 10 times from 0.8 us to 8 us.

A field included in the PLCP preamble of the 1/10 down clocked S1G frame format, that is, a STF 400-1 has the length of 2 OFDM symbols and the length of the symbols becomes 80 us. A LTF1 400-2 has also the length of 2 OFDM symbols and the length of the symbols becomes 80 us. That is, it takes total 160 us to reach a SIG 410 in the 1/10 down clocked SIG frame format.

The 1/10 down clocked SIG frame format shown in FIG. 4 may become the frame used in the frequency bandwidth of 1/10 times the frequency bandwidth supported from the existing IEEE 802.11ac. That is, the 1/10 down clocked SIG frame format may become the frame format used in the frequency bandwidth, that is, 2/4/8/16/8+8 MHz channel bandwidth of 1/10 times the frequency bandwidth, that is, 20/40/80/160/80+80 MHz defined at the existing 802.11 ac standard.

Table 1 below shows a performance comparison for 802.11ac PHY and 1/10 down-clocked S1G PHY.

TABLE 1

| CB | Throughput |
|---|---|
| IEEE 802.11ac PHY | |
| 20 MHz | 86.7 Mbps |
| 40 MHz | 200 Mbps |
| 80 MHz | 433.3 Mbps |
| 160 MHz | 866.7 Mbps |
| 80 + 80 MHz | 866.6 Mbps |
| 1/10 down-clocked S1G PHY | |
| 2 MHz | 8.67 Mbps |
| 4 MHz | 20 Mbps |
| 8 MHz | 43.33 Mbps |
| 16 MHz | 86.67 Mbps |
| 8 + 8 MHz | 86.66 Mbps |

Referring to Table 1, the 1/10 down clocked SIG PHY may support the frequency bandwidth of 1/10 times the existing frequency bandwidth being supported, and therefore, throughput has the throughout of 1/10 times the throughput in the existing frequency bandwidth. A bandwidth corresponding to 2/4/8/16/8+8 MHz channel bandwidth may be supported by a method of down-clocking the existing frame, but in case of the bandwidth corresponding to 1 MHz, the frequency bandwidth corresponding to 10 MHz in the existing frame structure is absent and therefore, it is impossible to perform the 1/10 down clocking in the existing frame structure.

Therefore, since the frame structure that may be applied at 1 MHz is absent, modulation values and the mapping method of the pilot tones should be newly defined in new frame structure and the corresponding frame. Further, like the M2M system being operated at sub 1 GHz, it should be also considered that the method of adding the GI to the frame structure to increase the throughput in the case that single user single streams are most streams.

Hereinafter, in the present embodiment, the frame that may use at sub 1 GHz is as follows.

(1) The frame format that may use in the frequency bandwidth of 1 MHz at sub 1 GHz (S1G) band (2) The method that includes the GI in the data field at the PPDU frame format used at sub 1 GHz (S1G) band (3) The method of mapping the pilot tones in the frame format that may use in the frequency bandwidth of 1 MHz First, the frame format that may use in the frequency bandwidth of 1 MHz at 1 GHz (S1G) band is described. The frame format to be used in the frequency bandwidth of, for example, 1 MHz smaller than 2 MHz may become the frame of making the repetition of the fields included in the 1/10 down clocked S1G frame format, that is, STF, LTF, SIG and DATA on time axis.

FIG. 5 is a conceptual view showing the frame that may use in the frequency bandwidth of 1 MHz at sub 1 GHz (S1G) band according to the embodiment of the present invention.

Referring to FIG. 5, the frame generated by the method of making the repetition of each field included in the frame may be used in the frequency bandwidth of 1 MHz. For example, it is possible to make the repetition of STF1 500, LTF1 510 and SIG 520. Each field may be allocated into 4 OFDM symbols having the number of the OFDM symbols of 2 times the number of the OFDM symbols allocated into the fields in FIG. 4 described above. The data field 550 may be selectively repeated or may not be selectively repeated. Likewise, the frame format of making the repetition of a PLCP preamble and PLCP header is called a long-range PLCP format.

The HT-Green field frame format, according to 802.11 ac standard, shown in FIG. 5 to describe the embodiment of the present invention is an example for the frame format. That is, different frame formats other than the HT-Green field frame format may be also formed by repeating the fields included in the PLCP preamble and PLCP header to use in the frequency bandwidth of 1 MHz, and these embodiments are also included in the scope of the present invention.

Next, the method that includes the GI in the data field, in the PPDU frame format used at the sub 1 GHz (S1G) band according to the embodiment of the present invention, is described.

In case of decoding the SIG including information about whether a Short GI is used in the PPDU frame format, decoding delay may be caused. In the case that the decoding delay is caused in the SIG, when the short GI is first applied to first symbol of the data field following immediately after the SIG, it is possible to reduce the burden of handling complex data processing. For this reason, in case of single stream transmission that Number of Streams(Nsts) is 1 in the HT-green field preamble at the existing 802.11n standard, it is required that the short GI(SGI) may not be used in the data field.

However, most traffics are more likely to be single-user single-stream transmission in sensor application at 802.11ah standard. Therefore, in the case that this environment prevents the short GI from using for the data format, it causes a large loss of the throughput. In particular, on applying 1/10 down-clocking to the frame format, real time of the short GI becomes 4 us. Since the short GI having the length of 4 us is far longer than typical indoor channel multi-path delay and becomes sufficient GI time except for the fact that multi-path delay is very large even in outdoor environment, it is effective to use the short GI for Nsts=1.

The SIG field in the 1/10 down clocked SIG frame format may include information about whether the GI is used. On using the GI, Long GI(LGI) may be applied to first Data OFDM symbol positioned in back end of the SIG field, and Short GI may be applied to Data OFDM symbols following the first Data OFDM symbol.

Figure 6:
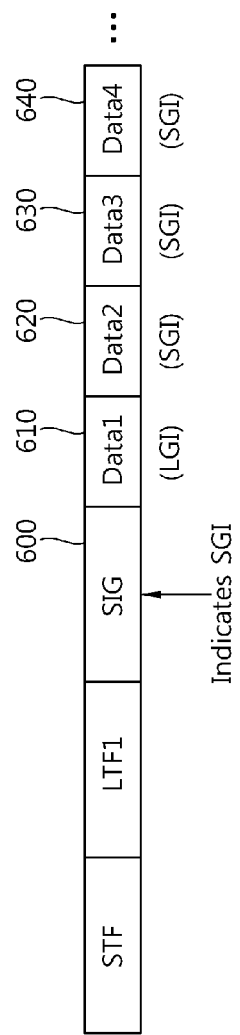
FIG. 6 is a conceptual view showing the method of using the GI to the data symbols in the embodiment of the present invention.

FIG. 6 is a conceptual view showing the method of using the GI to the data symbols in the embodiment of the present invention.

Referring to FIG. 6, the SIG 600 may show the use of the SGI in the data field.

The LGI may be used as the guard interval of the first data symbol 610 to be transmitted after the SIG 600, and The SGI may be used as the guard interval of the remaining data symbols 620, 630 and 640 to be transmitted after the first data symbol 610.

That is, when the single stream transmission is for Number of Streams (Nsts)=1, the LGI is always applied to the first Data OFDM symbol following the SIG and the Short GI may be applied to the following Data OFDM symbols, as the guard interval used to the data symbol.

Figure 7:
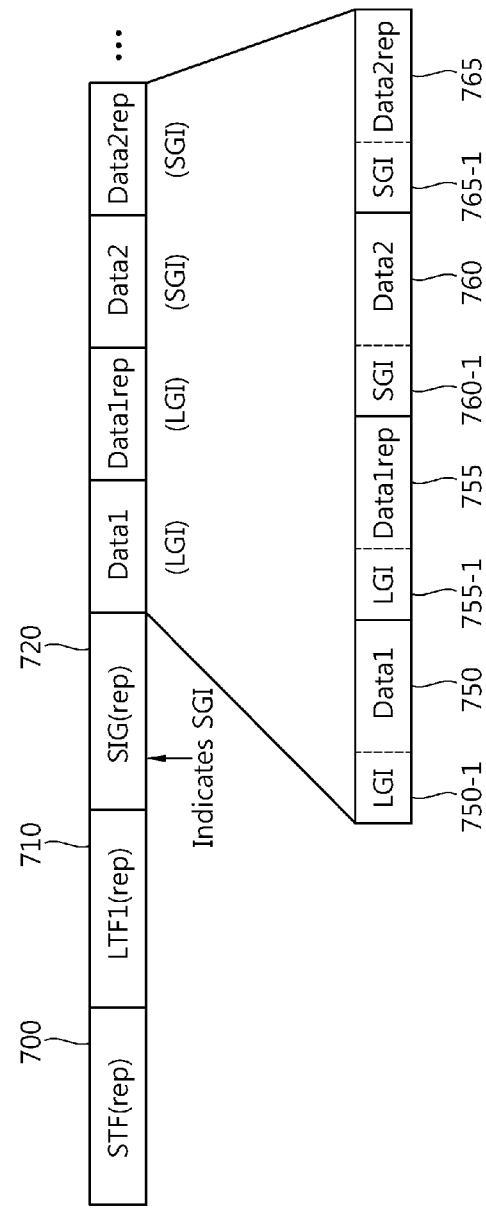
FIG. 7 is a conceptual view showing the method of using the GI to the data symbols in the embodiment of the present invention.

FIG. 7 is a conceptual view showing the method of using the GI to the data symbols in the embodiment of the present invention.

In FIG. 7, the repetition for a STF 700, a LTF 710 and a SIG 720 may be performed to be used in the frequency bandwidth of 1 MHz. Further, the repetition for the data symbols may be also performed and the GI may be applied to the data symbols.

The repetition for the STF 700, the LTF 710 and the SIG 720 may be performed. Further, as described above, the frame may perform the repetition for the data symbols to be used in the frequency bandwidth of 1 MHz too. The data symbols in which the repetition for specific data symbols is performed are defined as the terminology called data repetition symbols.

The data symbols in FIG. 7 may include a first data symbol 750, a first data repetition symbol 755, that is, the repetition for the first data symbol 750, a second data symbol 760, and a second data repetition symbol 765, that is, the repetition for the second data symbol 760.

In this case, the LGI 750-1 and 755-1 may be applied to the first data symbol 750 and the first data repetition symbol 755 as each GI, and the SGI 760-1 and 765-1 may be applied to the remaining data field, that is, the second data symbol 760 and the second data repetition symbol 765 as the GI.

That is, in the frame format applied to the bandwidth of 1 MHz, according to the embodiment of the present invention, the first data symbol following the SIG and the repetition for the first data symbol may apply the LGI, and the following remaining data symbol and data repetition symbol may apply the SGI.

Figure 8:
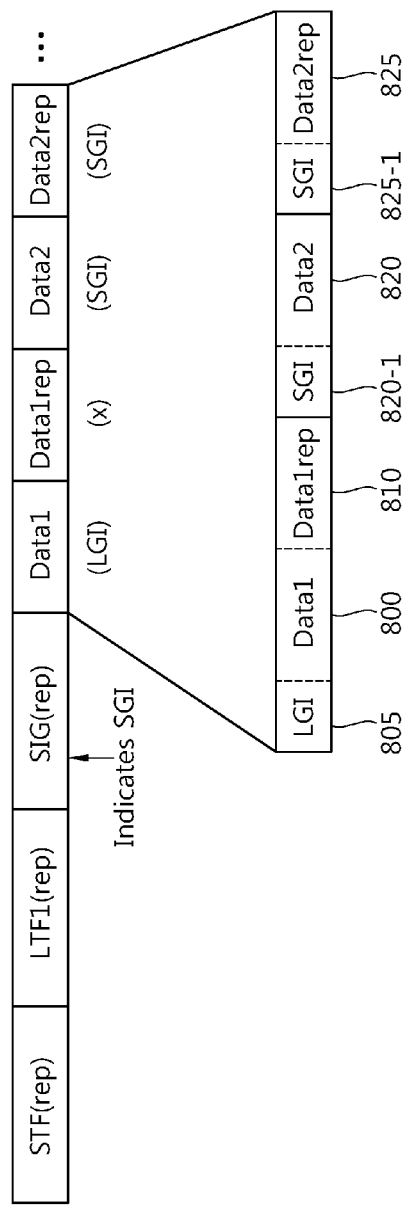
FIG. 8 is a conceptual view showing the frame format applying the GI in the embodiment of the present invention.

FIG. 8 is a conceptual view showing the frame format applying the GI in the embodiment of the present invention.

Referring to FIG. 8, as shown in FIG. 7 described above, on performing the symbol repetition for the data symbols so that the frame format may be used in the frequency bandwidth of 1 MHz, the method of applying the GI to the data symbol is shown. However, unlike FIG. 7, although the method of performing the repetition for the data field is used, the LGI is not inserted into a first data repetition symbol 810 and the method of sharing LGI 805 inserted to a first data symbol 800 may be used.

Like FIG. 7, SGIs 820-1 and 825-1 may be inserted into each data symbol for a second data symbol 820 and a second data repetition symbol 825, that is, the data field following a first data repetition symbol 810.

Like FIG. 8, on not using the guard interval for the first data repetition symbol, the value summing each length of the first data symbol 800 inserting one LGI 805 and the first data repetition symbol 810 may be the same as the value summing each length of the second data symbol 820 and the second data repetition symbol 825 each inserting SGIs 820-1 and 825-1. In this case, two symbols at a time may be transmitted at a regular time interval from the data field. Further, on using the frame format shown in FIG. 8, there is an advantage in that time overhead as the LGI in the frame may be reduced.

Figure 9:
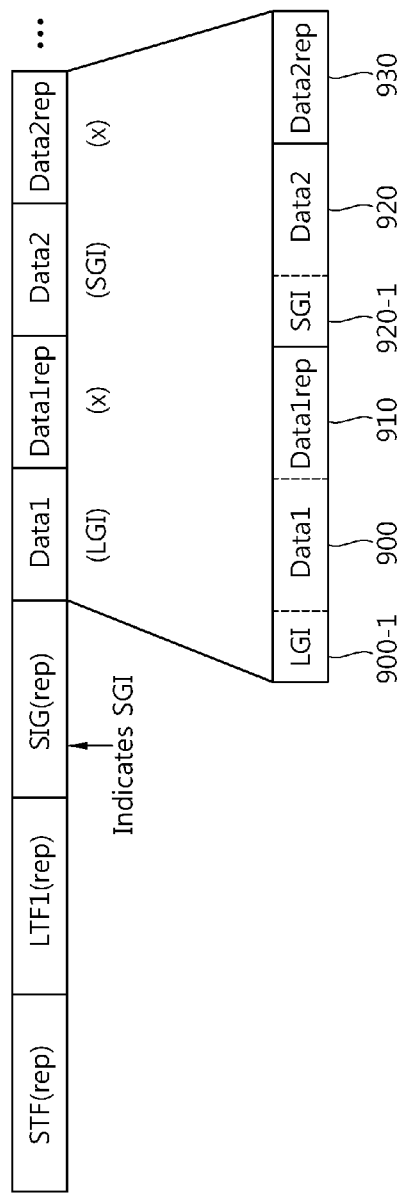
FIG. 9 is a conceptual view showing the frame format applying the GI in the embodiment of the present invention.

FIG. 9 is a conceptual view showing the frame format applying the GI in the embodiment of the present invention.

Referring to FIG. 9, it is possible to insert one SGI into a second data symbol 920 and second data repetition symbol 930 applying the SGI after a first data symbol 900 and first data repetition symbol 910 and to share it.

The first data symbol 800 and the first data repetition symbol 810 only share one LGI 805 in FIG. 8, but, in FIG. 9, the first data symbol 900 and first data repetition symbol 910 share one LGI 900-1 and the following second data symbol 920 and second data repetition symbol 930 may also share one SGI 920-1.

Figures 10, 11:
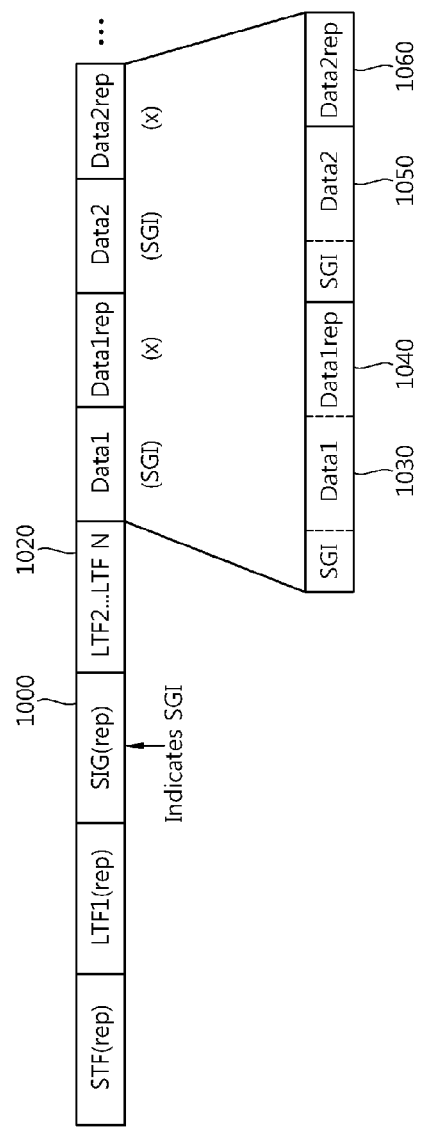
FIG. 10 is a conceptual view showing the frame format applying the GI in the embodiment of the present invention.
FIG. 11 shows the pilot values according to the frequency bandwidth of the embodiment of the present invention.

FIG. 10 is a conceptual view showing the frame format applying the GI in the embodiment of the present invention.

Referring to FIG. 10, in case of multi stream transmission that Number of Streams (Nsts) is above 2, it is possible to use the frame format including the GI.

On using the multi stream transmission, LTF2-LTFNs 1020 following the SIG 1000 may include LTF information for each stream. Since there is not the data symbol just after the SIG 1000, there is time enough to apply the SGI indicated in the SIG 1000 to data symbols 1030, 1040, 1050 and 1060. Therefore, the SGI may be applied to a first data symbol 1030 and first data repetition symbol 1040. The SGI may be also applied to a second data symbol 1050 and second data repetition symbol 1060 following the first data symbol 1030 and first data repetition symbol 1040.

Hereinafter, in the embodiment of the present invention, a method of transmitting pilot from the frame that may use in the frequency bandwidth of 1 MHz described above is described.

The pilots included in the data symbol may be used to compensate phase tracking or residual frequency offset errors. On transmitting and pre-coding multiple clusters (for example, 1 MHz*x), to generate pilot sequences having the lowest PAPR (peak to average power ratio), the pilot sequences for transmitting the pilot may be determined based on the following criteria.

(1) Use the BPSK (binary phase shift keying)/QPSK (quadrature phase shift keying) to minimize the complexity of the pilot sequences used for the phase tracking.

(2) Optimize the PARR in consideration of multiple transmission.

(3) Minimize the size of memory for storing pilot values.

The pilot values that meet above conditions may be determined according to the frequency bandwidth as a nested structure shown in FIG. 11 below.

FIG. 11 shows the pilot values according to the frequency bandwidth of the embodiment of the present invention.

Referring to FIG. 11, the pilot values used in 1 MHz, 2 MHz, 4 MHz and 8 MHz are set to the nested structure. The pilot values $\Psi_n$ may become parameters for representing the pilot values in 1 MHz (1100), 2 MHz(1120), 4 MHz(1140) and 8 MHz(1180) shown FIG. 11. $\Psi_n$ in FIG. 11 represents the pilot values in each frequency bandwidth in case of using the BPSK. A method of modulating the pilots may use different modulation method such as the QPSK other than the BPSK. On using the BPSK as the modulation method, it is possible to lower the complexity of operation as compared with different modulation method by using a sign converter without performing multiplication.

Referring to FIG. 11, the pilot values are as follows according to each frequency bandwidth, that is, 1) pilot values [1, 1] in the case that the frequency bandwidth is 1 MHz 2) pilot values [1, 1, 1, −1] in the case that the frequency bandwidth is 2 MHz 3) pilot values [1, 1, 1, −1, −1, 1] in the case that the frequency bandwidth is 4 MHz 4) pilot values [1, 1, 1, −1, −1, 1, 1, 1] in the case that the frequency bandwidth is 8 MHz, and the pilots may be mapped on the frequency axis and time axis using each of the pilot values.

The pilot values for each frequency band shown in FIG. 11 may be inferred based on the nested structure. The nested structure refers to the structure that the pilot values in the specific frequency bandwidth include the pilot values in different frequency bandwidth. Therefore, on recognizing information for the pilot values in the frequency bandwidth of 8 MHz based on the nested structure, since the pilot values in the remaining frequency bandwidth, that is, 1 MHz, 2 MHz and 4 MHz except 8 MHz may be inferred, it is possible to reduce the size of the memory for storing the pilot values for each frequency band.

Hereinafter, in the embodiment of the present invention, a method of transmitting the pilots for each frequency band is described based on the pilot values.

The allocation of the subcarriers may be represented using the indexes of the subcarriers on the frequency axis. As shown in FIG. 3 described above, the values of −26~26 may be used for the OFDM symbols as the index values for representing the allocation of the subcarriers on the frequency axis, and each subcarrier may be mapped on the indexes. The $0^{th}$ subcarrier corresponding to a center frequency of each subcarrier is not used and the remaining subcarriers may be used to transmit pilot tones or data symbols. The number and positions of the pilots used in the OFDM symbols may be differed from each other according to the sizes of the frequency bands.

(1) In case of the frequency bandwidth of 1 MHz,

In case of the frequency bandwidth of 1 MHz, two pilots for each OFDM symbol may be mapped on the indexes −7, 7 of the subcarrier. ($P_n^k$) representing the mapping of the pilots in equations below is parameter for representing the pilots at subcarrier k for OFDM symbol n.

Equation 1 below represents the pilot sequences in case of the frequency bandwidth of 1 MHz.

$$P_n^{\{-7,7\}} = \{\Psi_{1,n \bmod 2}^{(1)}, \Psi_{1,(n+1) \bmod 2}^{(1)}\}$$

$$P_n^{k \notin \{-7,7\}} = 0 \qquad \text{<Equation 1>}$$

Referring to the Equation 1, in case that the indexes of the subcarriers are −7, 7, it is represented that the pilots are transmitted from OFDM symbol n.

$\Psi_{1,m}^{(1)}$ represents the case of the single stream transmission, and a table 1 below is pilot mapping table representing the pilot value corresponding to m.

<Table 1>

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

That is, In case of the frequency bandwidth of 1 MHz, the pilots may be mapped while having the pilot value of [1, 1] on the indexes [−7, 7] of the subcarriers.

(2) In case of the frequency bandwidth of 2 MHz

In case of the frequency bandwidth of 2 MHz, the positions for the subcarriers of the pilots may become −21, −7, 7, 21. A Equation 2 below represents the pilot values according to the positions of the subcarriers in case of the frequency bandwidth of 2 MHz.

$$P_n^{\{-21,-7,7,21\}} = \{\Psi_{1,n \bmod 4}^{(1)}, \Psi_{1,(n+1) \bmod 4}^{(1)}, \Psi_{1,(n+2) \bmod 4}^{(1)}, \Psi_{1,(n-3) \bmod 4}^{(1)}\}$$

$$P_n^{k \notin \{-21,-7,7,21\}} = 0 \qquad \text{<Equation 2>}$$

$\Psi_{1,m}^{(1)}$ in the Equation 2 may have the pilot values in the table 1 described above.

That is, In case of the frequency bandwidth of 2 MHz, the positions of the subcarriers, in which the pilots are positioned, are −21, −7, 7, 21 and the subcarriers may have the values that shift the pilot values [1, 1, 1, −1] by increasing the OFDM symbol n by mod operation. For example, when the OFDM symbols is 0, the pilot values have the values of [1, 1, 1, −1], and when the OFDM symbol is 1, the pilot values may have the values of [1, 1, −1, 1] shifting the pilot values one by one.

(3) In case of the frequency bandwidth of 4 MHz

In case of the frequency bandwidth of 4 MHz, the positions of the subcarriers, in which the pilots are transmitted, may become −53, −25, −11, 11, 25, 53. A Equation 3 below represents the pilot sequences in case of the frequency bandwidth of 4 MHz.

$$P_n^{\{-53,-25,-11,11,25,53\}} = \{\Psi_{1,n \bmod 6}^{(1)}, \Psi_{1,(n+1) \bmod 6}^{(1)}, \ldots, \Psi_{1,(n+5) \bmod 6}^{(1)}\}$$

$$P_n^{k \notin \{-53,-25,-11,11,25,53\}} = 0 \qquad \text{<Equation 3>}$$

$\Psi_{1,m}^{(1)}$ in the Equation 3 may have the pilot values in the table 1 described above.

In case of the frequency bandwidth of 4 MHz, the positions of the subcarriers, in which the pilots are transmitted, are −53, −25, −11, 11, 25, 53, and the subcarriers may have the values that shift the pilot values [1, 1, 1, −1, −1, 1] by increasing the OFDM symbol n by the mod operation. For example, when the OFDM symbol is 0, the pilot values have the values of [1, 1, 1, −1, −1, 1], and when the OFDM symbol is 1, the pilot values may have the values of [1, 1, −1, −1, 1, 1] shifting the pilot values one by one.

(4) In case of the frequency bandwidth of 8 MHz

In case of the frequency bandwidth of 8 MHz, the positions for the indexes of the subcarriers, in which the pilots are transmitted, may become −103, −75, −39, −11, 11, 38, 75, 103. A Equation 5 below represents the pilot sequences in case of the frequency bandwidth of 8 MHz.

$$P_n^{\{-103,-75,-39,-11,11,39,75,103\}} = \{\Psi_{n \bmod 8}, \Psi_{(n+1) \bmod 8}, \ldots, \Psi_{(n+7) \bmod 6}\}$$

$$P_n^{k \notin \{-103,-75,-39,-11,11,39,75,103\}} = 0 \qquad \text{<Equation 5>}$$

$\Psi_m$ in the Equation 5 may have the values in the table 1 described above

That is, In case of the frequency bandwidth of 8 MHz, the positions of the subcarriers, in which the pilots are transmitted, are −103, −75, −39, −11, 11, 38, 75, 103 and the subcarriers may have the values that shift the pilot values [1, 1, 1, −1, −1, 1, 1, 1] by the mod operation. The pilot values in the Equation 5 may be shifted by increasing OFDM symbol n one by one. For example, when the OFDM symbol is 0, the pilot values have the values of [1, 1, 1, −1, −1, 1, 1, 1], and when the OFDM symbol is 1, the pilot values may have the values of [1, 1, −1, −1, 1, 1, 1, 1] shifting the pilot values one by one.

In the embodiment of the present invention, to transmit the pilot signals according to each frequency bandwidth, 1) determine whether which transmission bandwidth is used to transmit the pilot signals 2) determine the pilot values based on the pilot mapping table, such as the table 1, according to the transmission bandwidth. 3) transmit the pilot signals by N OFDM symbols based on the indexes of the subcarriers to which the determined pilot values and pilot signals are transmitted.

The pilot signals above may be transmitted as a plurality of spatial streams, and the pilot values transmitted from each spatial stream of the plurality of spatial streams may have the same values. For example, when the pilot values transmitted from a first spatial stream are determined, the values are copied into the pilot values of a second spatial stream. The same pilot values may be transmitted from the first spatial stream and second spatial stream by this method.

In another embodiment of the present invention, the pilot values applied to the frequency bandwidth of 1 MHz may have different values from each other to have time varying characteristic.

Figures 12, 13:
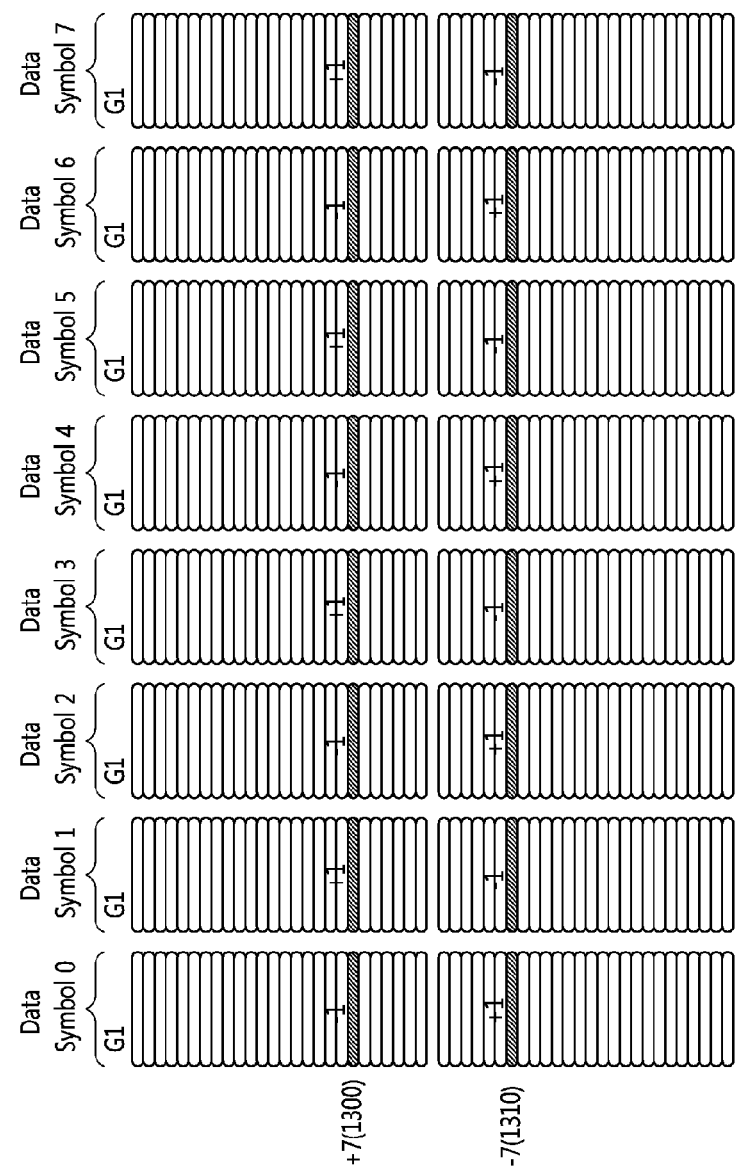
FIG. 12 shows the pilot values according to the frequency bandwidth in the embodiment of the present invention.
FIG. 13 is a conceptual view showing the pilot sequences according to the OFDM symbols in the embodiment of the present invention.

FIG. 12 shows the pilot values according to the frequency bandwidth in the embodiment of the present invention.

Referring to FIG. 12, it is possible to use the values of [1, −1] as the pilot values applied to the bandwidth 1200 of 1 MHz.

A Equation 6 below represents the pilot sequences using the values having signs different from each other as the pilot values applied to the bandwidth of 1 MHz.

$$P_n^{\{-7,7\}} = \{\Psi_{(n \bmod 2)+2}, \Psi_{((n+1) \bmod 2)+2}\}$$

$$P_n^{k \notin \{-7,7\}} = 0 \qquad \text{<Equation 6>}$$

Referring to the Equation 6, in case of n=0 by adding 2 after performing the mod operation, the pilot values may have the values different from each other using the pilot values corresponding to $\Psi_2$, $\Psi_3$ in the frequency bandwidth of 1 MHz.

Further, the pilot values used at 1 MHz are included in the pilot values used at 2 MHz such that the table calculating the pilot values may maintain the nested structure.

Referring to the Equation 6, the indexes of the OFDM symbols, that is, n value are increased and decreased, thereby to persistently change the signs of the pilot values. For example, when the indexes of the OFDM symbols are 0, the pilot values have the values of +1, −1, and when the indexes of the OFDM symbols are 1, the pilot values have the values of −1, +1.

It is assumed that the pilot signals are mapped on the indexes −7, 7 of the subcarriers, but the pilots may be mapped on different positions other than the indexes −7, 7 of the subcarriers. For example, the pilot signals are mapped on the range of −28~+28 rather than the index 0 of the subcarriers. Hereinafter, for convenience of description, in the embodiment of the present invention, it is assumed that the pilots are transmitted to the indexes −7, 7 of the subcarriers.

FIG. 13 is a conceptual view showing the pilot sequences according to the OFDM symbols in the embodiment of the present invention.

Referring to FIG. 13, as described above, the pilots may be transmitted to the indexes 7(1300), −7(1310) of the subcarriers. The pilot values may be changed by increasing the indexes of the OFDM symbols, for example, when the index n of the OFDM symbols is 0, a pilot 1310 positioned in the index −7 of the subcarriers may have the value of +1 and a pilot 1300 positioned in the index 7 of the subcarriers may have the value of −1. When the indexes n of the OFDM symbols is increased to 1, the pilot 1300 positioned in the index −7 of the subcarriers may have the value of −1 and the pilot 1310 positioned in the index 7 of the subcarriers may have the value of +1.

A method of setting the pilot values in another frequency bandwidth of 1 MHz may differently set the pilot sequences for each OFDM symbols by changing offset values and applied length (window) values.

When the offset values of the set pilot values are $n_{start}$ and the periods of pseudo random sequences are $N_{window}$, the pilot sequences may be determined according to the OFDM symbols by a Equation 7 below.

$$P_n^{\{-7,7\}} = \{\Psi_{(n \bmod N_{window})+n_{start}}, \Psi_{((n+1) \bmod N_{window})+n_{start}}\}$$

$$P_n^{k \notin \{-7,7\}} = 0 \qquad \text{<Equation 7>}$$

The representation for the pilot sequences like the Equation 8 below may be used as the representation different from the Equation 7. The Equation 8 represents the pilot sequences generated on applying the pilot values in reverse order from the table, wherein n+1 is replaced with n−1.

$$P_n^{\{-7,7\}} = \{\Psi_{(n \bmod N_{window})+n_{start}}, \Psi_{((n+1) \bmod N_{window})+n_{start}}\}$$

$$P_n^{k \notin \{-7,7\}} = 0 \qquad \text{<Equation 8>}$$

The Equation 6 described above represents a way that the pilot values are changed using the mod 2 operation by 2 OFDM data symbols. It is possible to differently set a randomization period by applying different N values (wherein, N is natural number larger than 2), that is, modN instead of 2 used at mod 2 on performing modulo operation according to the present invention of the present invention.

For example, it is possible to set the offset values, that is, n_start to 0, and to set the period values of the pilot values, that is, N_window to 4. In this case, the pilot values may be changed for each period corresponding to 4 OFDM symbols. A Equation 9 below shows the pilot sequences in case that the offset values, that is, n_start are set to 0, and the period values of the pilot values, that is, N_window are set to 4.

$$P_n^{\{-7,7\}} = \{\Psi_{n \bmod 4}, \Psi_{(n+1) \bmod 4}\} \qquad \text{<Equation 9>}$$

The pilot sequences in the Equation 9 may be formed like FIG. 13 on the OFDM symbols.

Figure 14:
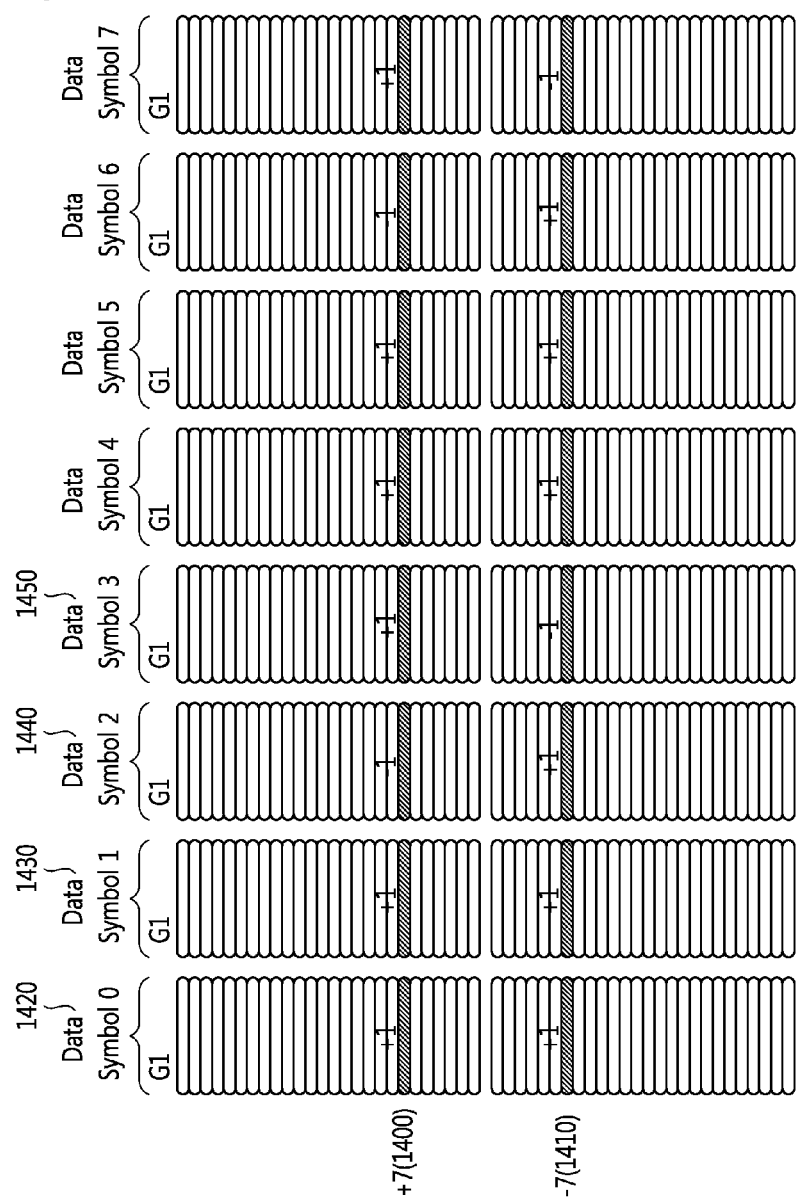
FIG. 14 is a conceptual view showing the pilot sequences according to the OFDM symbols in the embodiment of the present invention.

FIG. 14 is a conceptual view showing the pilot sequences according to the OFDM symbols in the embodiment of the present invention.

Referring to FIG. 14, the pilots may be transmitted from the indexes 7(1400), −7(1410) of the subcarriers. The pilot values may be changed by increasing the indexes of the OFDM symbols, and may have the values different from each other as the periods of 4 OFDM symbols unlike FIG. 12. For example, the pilot values become [1, 1] in case that the index of the OFDM symbol is 0(1420), the pilot values become [1, 1] in case that the index of the OFDM symbol is 1(1430), the pilot values become [1, −1] in case that the index of the OFDM symbol is 2(1440), and the pilot values become [−1, 1] in case that the index of the OFDM symbol is 3(1450).

The pilot sequences in Equation 10 may be used as further another pilot sequence according to the embodiment of the present invention. A Equation 10 below shows the pilot sequences in case that the offset values, that is, n_start are set to 0, and the period values of the pilot values, that is, N_window are set to 6.

$$P_n^{\{-7,7\}} = \{\Psi_{n \bmod 6}, \Psi_{(n+1) \bmod 6}\} \qquad \text{<Equation 10>}$$

The pilot tone sequences in the Equation 10 may be formed like FIG. 14 on the OFDM symbols.

Figure 15:
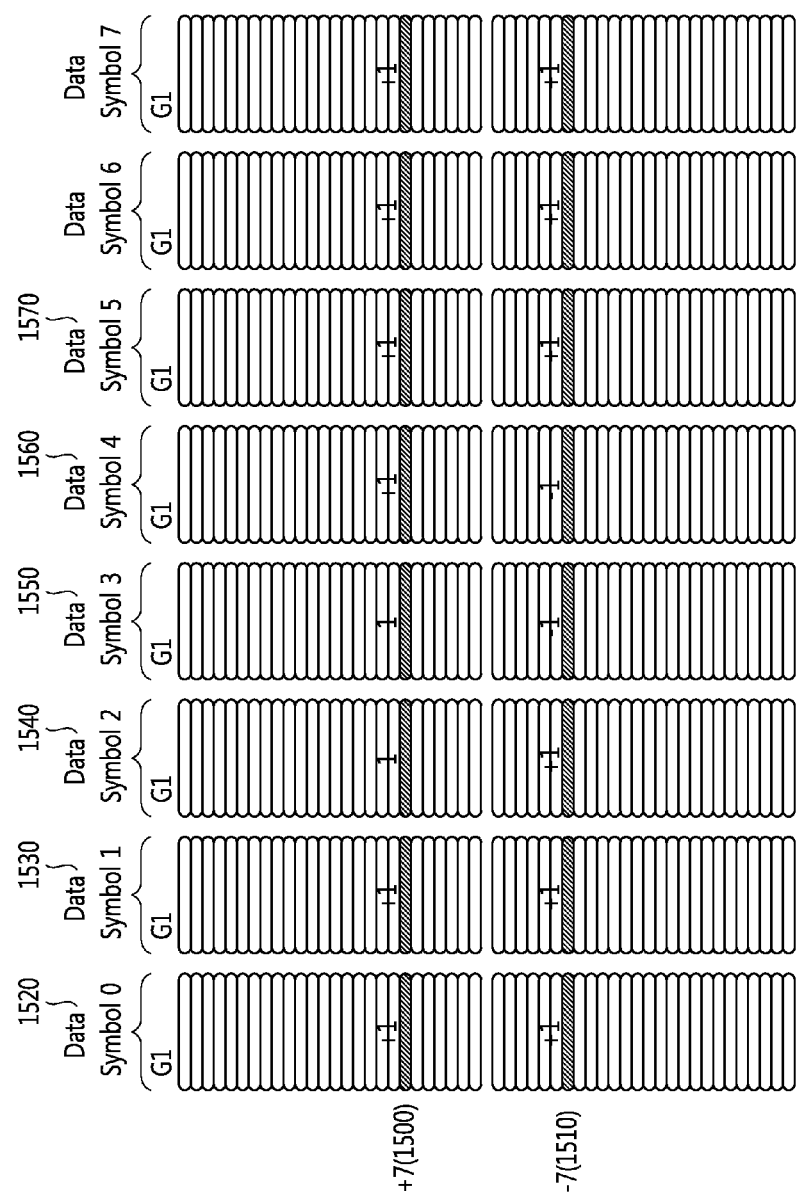
FIG. 15 is a conceptual view showing the pilot sequences according to the OFDM symbols in the embodiment of the present invention.

FIG. 15 is a conceptual view showing the pilot sequences according to the OFDM symbols in the embodiment of the present invention.

Referring to FIG. 15, the pilots may be transmitted from the indexes 7(1500), −7(1510) of the subcarriers. The pilot values may be changed by increasing the indexes of the OFDM symbols, and may have the values different from each other as the periods of 6 OFDM symbols unlike FIG. 14. For example, the pilot values become [1, 1] in case that the index of the OFDM symbol is 0(1520), the pilot values become [1, 1] in case that the index of the OFDM symbol is 1(1530), the pilot values become [1, −1] in case that the index of the OFDM symbol is 2(1540), the pilot values become [−1, −1] in case that the index of the OFDM symbol is 3(1550), the pilot values become [−1, 1] in case that the index of the OFDM symbol is 4(1560), and the pilot values become [1, 1] in case that the index of the OFDM symbol is 5(1570).

The pilot sequence in Equation 11 may be used as further another pilot sequence according to the embodiment of the present invention. The Equation 11 below shows the pilot sequences in case that the offset values, that is, n_start are set to 0, and the period values of the pilot values, that is, N_window are set to 8.

$$P_n^{\{-7,7\}} = \{\Psi_{n \bmod 8}, \Psi_{(n+1) \bmod 8}\} \qquad \text{<Equation 11>}$$

Figure 16:
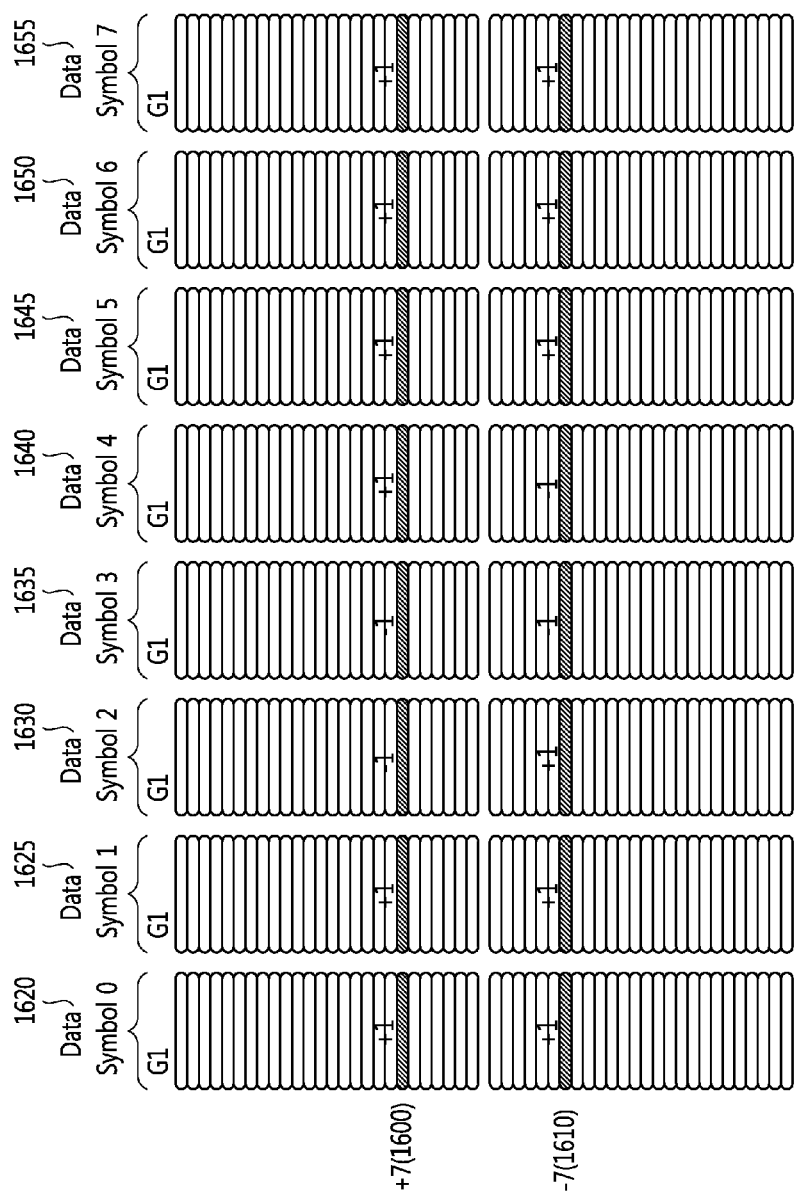
FIG. 16 is a conceptual view showing the pilot sequences according to the OFDM symbols in the embodiment of the present invention.

The pilot tone sequence in the Equation 11 may be formed like FIG. 16 on the OFDM symbols.

FIG. 16 is a conceptual view showing the pilot sequences according to the OFDM symbols in the embodiment of the present invention.

Referring to FIG. 16, the pilots may be transmitted from the indexes 7(1600), −7(1610) of the subcarriers. The pilot values may be changed by increasing the indexes of the OFDM symbols, and may have the values different from each other as the periods of 8 OFDM symbols unlike FIG. 12. For example, the pilot values become [1, 1] in case that the index of the OFDM symbol is 0(1620), the pilot values become [1, 1] in case that the index of the OFDM symbol is 1(1625), the pilot values become [1, −1] in case that the index of the OFDM symbol is 2(1630), the pilot values become [−1, −1] in case that the index of the OFDM symbol is 3(1635), the pilot values become [−1, 1] in case that the index of the OFDM symbol is 4(1640), the pilot values become [1, 1] in case that the index of the OFDM symbol is 5(1645), the pilot values become [1, 1] in case that the index of the OFDM symbol is 6(1650), and the pilot values become [1, 1] in case that the index of the OFDM symbol is 7(1655).

The values that multiply the pilot values by constant variable may be used as the values corresponding to the pilot tones in further another pilot sequence according to the embodiment of the present invention. In a Equation 12 below, the offset values, that is, n_start are set to 0, and the period values of the pilot values, that is, N_window are set to 2, and the values applying [1,−j] to the pilot values may be used as the pilot values.

$$P_n^{\{-7,7\}} = \{j^{n \bmod 2} \cdot \Psi_{n \bmod 2}, j^{(n+1) \bmod 2} \cdot \Psi_{(n+1) \bmod 2}\} \qquad \text{<Equation 12>}$$

The pilot tone sequences in the Equation 12 may be formed like FIG. 15 on the OFDM symbols.

Figure 17:
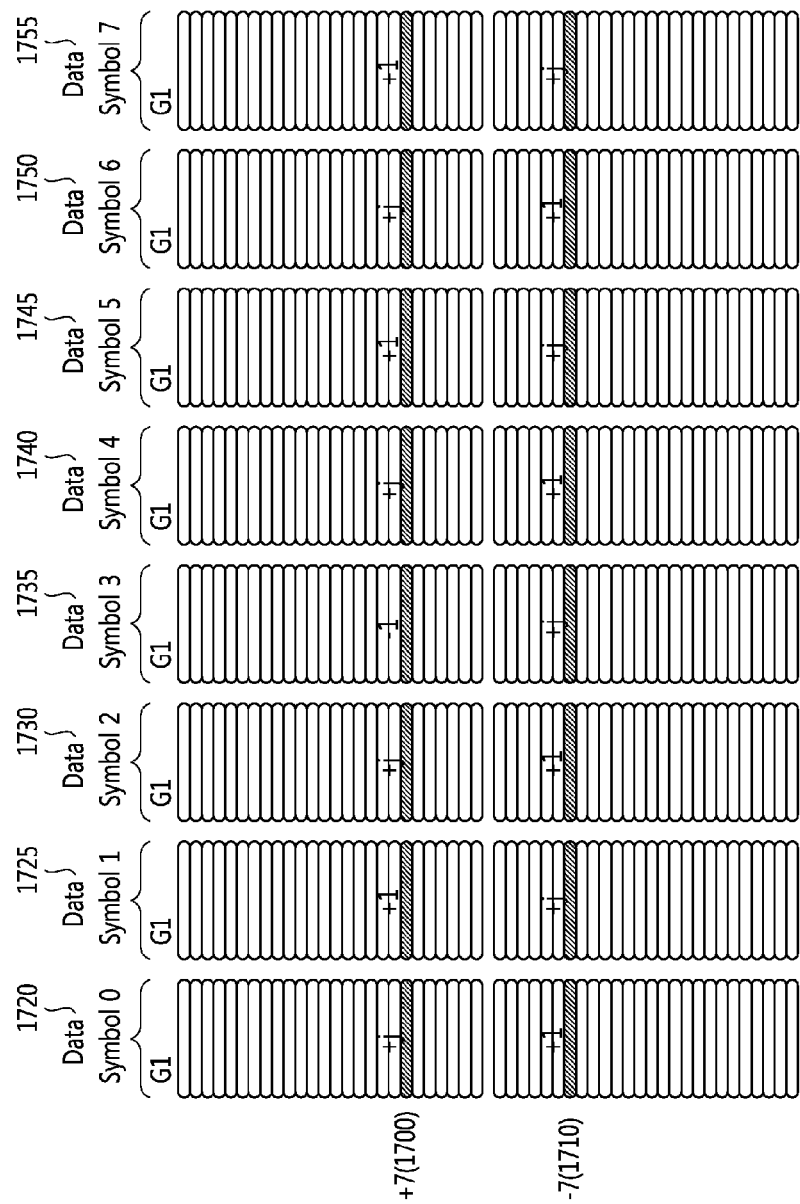
FIG. 17 is a conceptual view showing the pilot sequences according to the OFDM symbols in the embodiment of the present invention.

FIG. 17 is a conceptual view showing the pilot sequences according to the OFDM symbols in the embodiment of the present invention.

Referring to FIG. 17, the pilots may be transmitted from the indexes 7(1700), −7(1710) of the subcarriers. The pilot values may be changed based on the periods of 2 OFDM symbols by increasing the indexes of the OFDM symbols. Unlike FIG. 14, the pilot values become [1, j] in case that the indexes of OFDM symbols are 0(1720), and the pilot values become [j, 1] in case that the indexes of OFDM symbols are 1(1725).

The Equation 7 described above may be also represented as the equation that multiply the pilot values by constant variable. A Equation 13 below may be represented as the equation that multiply the pilot values by constant variable $$P_n^{\{-7,7\}} = \{(-1)^{n \bmod 2} \cdot \Psi_{n \bmod 2}, (-1)^{(n+1) \bmod 2} \cdot \Psi_{(n+1) \bmod 2}\} \qquad \text{<Equation 13>}$$

The Equation 13 is the equation that represents the same pilot sequences as the Equation 7 except that the representation methods of the Equations 13 and 7 differ from each other.

In the embodiment of the present invention, the pilot sequences may be represented as the values that multiply the pilot values used in the frequency bandwidth of 1 MHz by constant variable, like Equation 14 or 15 below, while maintaining the nested structure.

$$P_n^{\{-7,7\}} = \{A \cdot \Psi_{(n \bmod N_{window}) + n_{start}} \cdot B \cdot \Psi_{((n+1) \bmod N_{window}) + n_{start}}\} \qquad \text{<Equation 14>}$$

$$P_n^{\{-7,7\}} = \{A \cdot \Psi_{(n \bmod N_{window}) + n_{start}} \cdot B \cdot \Psi_{((n-1) \bmod N_{window}) + n_{start}}\} \qquad \text{<Equation 15>}$$

Figure 18:
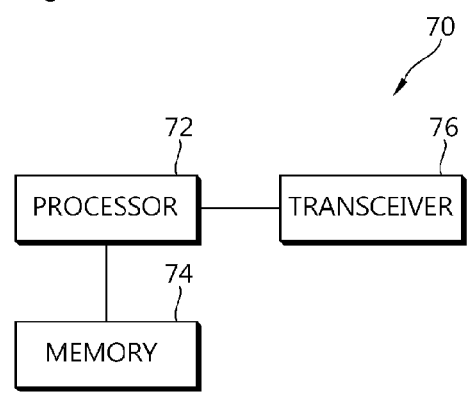
FIG. 18 is a block view showing a wireless device to which the embodiment of the present invention may be applied.

FIG. 18 is a block view showing a wireless device to which the embodiment of the present invention may be applied.

The wireless device 70 is a terminal capable of implementing the above-described embodiments, and may become AP or non-AP station.

The wireless device 70 includes a processor 72, a memory 74, and a transceiver 76. The transceiver 76 transmits/receives wireless signals, and the physical layers related to IEEE 802.11 are implemented. Further, the transceiver 76 may transmit the plurality of subcarriers including the pilot tones using the frequency bandwidth of 1 MHz according to the embodiment of the present invention.

The processor 72 is functionally connected to the transceiver 76, thereby to implement MAC layers and the physical layers related to IEEE 802.11. The processor 72 generates the frame formats that may use in the frequency bandwidth of 1 MHz at sub 1 GHz(SIG) band, includes the GI in the data field in PPDU frame format used at sub 1 GHz(SIG) band, and may map the pilots in the frame format that may use in the frequency bandwidth of 1 MHz, according to the embodiment of the present invention. That is, the processor 72 may be set to implement the embodiments of the above-described present invention.

The processor 72 and the transceiver 76 may include an ASIC (application-specific integrated circuit), other chipsets, logical circuits and/or data processors. The memory 74 may include a ROM (read-only memory), a RAM (random access memory), a flash memory, a memory card, a storage medium and/or an other storage device. On implementing the embodiments by software, the above-described scheme may be implemented by modules (processes, functions etc.) performing the above-described functions. The modules are stored into the memory 74, and may be executed by the processor 72. The memory 74 may be present inside or outside the processor 72, and may be connected to the processor 72 by well-known various means.

The invention claimed is:

1. A method of transmitting pilots, the method comprising:
transmitting pilots over N orthogonal frequency division multiplexing (OFDM) symbols,
wherein a pilot $P_n^k$ at subcarrier k for OFDM symbol n is determined by:

$$P_n^{k=-7} = \Psi_{(n \bmod 2) + 2}, P_n^{k=7} = \Psi_{((n+1) \bmod 2) + 2}, P_n^{k \notin \{-7,7\}} = 0$$

wherein a OFDM symbol index n=0, . . . , N−1, pilot values $\Psi_2 = 1$ and $\Psi_3 = -1$.

2. The method of claim 1, wherein a bandwidth of the transmitted pilots is 1 MHz.

3. The method of claim 1, wherein k is an integer in the range −K≤k≤K(k≠0), and K is an integer in the range 7≤K≤28.

4. The method of claim 1, further comprising:
selecting a transmission bandwidth;
determining predetermined pilot values in a pilot value mapping table according to a range of the transmission bandwidth; and inserting the predetermined pilot values over N orthogonal frequency division multiplexing (OFDM) symbols,
wherein the predetermined pilot values are $\{\Psi_2, \Psi_3\}$ in the pilot value mapping table when the range of the transmission bandwidth is 1 MHz; and
wherein the pilot value mapping table is specified as below

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1. |

5. The method of claim 1, wherein the pilots are binary phase shift keying(BPSK) modulated by pseudo-binary sequence.

6. The method of claim 1, wherein the step of transmitting the pilots over N OFDM symbols includes:
transmitting first pilots for a first spatial stream;
copying a mapping of the first pilots to a mapping of a second pilots of a second spatial stream; and
transmitting the second pilots of the second spatial stream.

7. A wireless device configured to transmit control signals in a wireless communication system, the wireless device comprising a processor configured to:
transmit pilots over N orthogonal frequency division multiplexing (OFDM) symbols,
wherein a pilot $P_n^k$ at subcarrier k for OFDM symbol n is determined by:

$$P_n^{k=-7} = \Psi_{(n \bmod 2)+2}, P_n^{k=7} = \Psi_{((n+1) \bmod 2)+2}, P_n^{k \notin \{-7,7\}} = 0$$

wherein a OFDM symbol index, n=0, ..., N −1, pilot values $\Psi_2=1$ and $\Psi_3=-1$.

8. The wireless device of claim 7, wherein a bandwidth of the transmitted pilots is 1 MHz.

9. The wireless device of claim 7, wherein k is an integer in the range −K≤k≤K(k≠0), and K is an integer in the range 7≤K≤28.

10. The wireless device of claim 7, wherein the processor is further configured to transmit pilots over N orthogonal frequency division multiplexing (OFDM) symbols by:
selecting a transmission bandwidth;
determining predetermined pilot values in a pilot value mapping table according to a range of the transmission bandwidth; and
inserting the predetermined pilot values over N orthogonal frequency division multiplexing (OFDM) symbols,
wherein the predetermined pilot values are $\{\Psi_2, \Psi_3\}$ in the pilot value mapping table when the range of the transmission bandwidth is 1 MHz; and
wherein the pilot value mapping table is specified as below

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1. |

11. The wireless device of claim 7, wherein the pilots are binary phase shift keying(BPSK) modulated by pseudo-binary sequence.

12. The wireless device of claim 7, wherein the step of transmitting the pilots over N OFDM symbols includes:
transmitting first pilots for a first spatial stream;
copying a mapping of the first pilots to a mapping of a second pilots of a second spatial stream; and
transmitting the second pilots of the second spatial stream.

* * * * *